(12) United States Patent
Lee (10) Patent No.: US 12,298,622 B2
(45) Date of Patent: May 13, 2025

(54) DISPLAY PANEL INCLUDING COMPOSITE SHEET

(71) Applicant: LG Display Co., Ltd., Seoul (KR)

(72) Inventor: Inwha Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/596,417

(22) Filed: Mar. 5, 2024

(65) Prior Publication Data

US 2024/0210756 A1 Jun. 27, 2024

Related U.S. Application Data

(63) Continuation of application No. 18/073,428, filed on Dec. 1, 2022, now Pat. No. 11,953,782.

(30) Foreign Application Priority Data

Dec. 28, 2021 (KR) .......................... 10-2021-0189573

(51) Int. Cl.
*G02F 1/13357* (2006.01)
*G02F 1/1333* (2006.01)

(52) U.S. Cl.
CPC .. *G02F 1/133606* (2013.01); *G02F 1/133311* (2021.01); *G02F 1/133603* (2013.01); *G02F 2202/28* (2013.01)

(58) Field of Classification Search
CPC ......... G02F 1/133567; G02F 1/133311; G02F 1/133603; G02F 1/133504; G02F 1/133507; G02F 1/133606
See application file for complete search history.

(56) References Cited

U.S. PATENT DOCUMENTS

| | | | |
|---|---|---|---|
| 7,380,953 B2 | 6/2008 | Onishi et al. | |
| 7,538,834 B2 | 5/2009 | Onishi et al. | |
| 7,784,954 B1 | 8/2010 | Coleman | |
| 7,920,229 B2 | 4/2011 | Onishi et al. | |
| 7,956,954 B2 * | 6/2011 | Lee ...................... | G02B 5/0242 349/64 |
| 7,960,021 B2 | 6/2011 | Im et al. | |
| 8,039,065 B2 | 10/2011 | Ikeda et al. | |
| 8,114,499 B2 | 2/2012 | Hsu et al. | |
| 9,335,576 B2 | 5/2016 | Shin et al. | |
| 9,620,688 B2 | 4/2017 | Lee et al. | |
| 10,890,697 B2 | 1/2021 | Park et al. | |
| 11,231,541 B2 | 1/2022 | Tak et al. | |
| 11,609,371 B2 | 3/2023 | Tak et al. | |
| 2004/0136155 A1 | 7/2004 | Onishi et al. | |

(Continued)

FOREIGN PATENT DOCUMENTS

CN 1282017 C 10/2006
CN 110888265 A 3/2020

(Continued)

OTHER PUBLICATIONS

Taiwan Intellectual Property Office, Office Action, Taiwanese Patent Application No. 111141725, Aug. 9, 2023, 17 pages.

(Continued)

*Primary Examiner* — Zheng Song
(74) *Attorney, Agent, or Firm* — Fenwick & West LLP (57) ABSTRACT

The present disclosure relates to a display panel including a composite optical sheet that can replace the existing optical sheet and diffusion plate.

14 Claims, 10 Drawing Sheets

(56) References Cited

U.S. PATENT DOCUMENTS

| | | | |
|---|---|---|---|
| 2006/0244880 A1 | 11/2006 | Onishi et al. | |
| 2006/0290253 A1 | 12/2006 | Yeo et al. | |
| 2007/0146887 A1 | 6/2007 | Ikeda et al. | |
| 2008/0305301 A1 | 12/2008 | Hsu et al. | |
| 2009/0201442 A1 | 8/2009 | Onishi et al. | |
| 2010/0143702 A1 | 6/2010 | Im et al. | |
| 2011/0096402 A1 | 4/2011 | Sun et al. | |
| 2013/0088661 A1 | 4/2013 | Shin et al. | |
| 2014/0183571 A1 | 7/2014 | Lee et al. | |
| 2017/0090241 A1 | 3/2017 | Eo et al. | |
| 2017/0153362 A1* | 6/2017 | Cho | G02B 5/0226 |
| 2017/0153363 A1* | 6/2017 | Lee | G02F 1/133504 |
| 2018/0307092 A1 | 10/2018 | Lin et al. | |
| 2018/0372930 A1 | 12/2018 | Park et al. | |
| 2019/0155100 A1 | 5/2019 | Yasui et al. | |
| 2020/0081173 A1* | 3/2020 | Tak | G02F 1/133502 |
| 2020/0200344 A1 | 6/2020 | Asaoka et al. | |
| 2020/0209668 A1 | 7/2020 | Tsuda et al. | |
| 2020/0233255 A1 | 7/2020 | Lin et al. | |
| 2021/0063814 A1* | 3/2021 | Guo | G02F 1/136286 |
| 2021/0271135 A1 | 9/2021 | Iwamoto et al. | |
| 2022/0123247 A1 | 4/2022 | Tak et al. | |
| 2023/0142417 A1 | 5/2023 | Allen et al. | |

FOREIGN PATENT DOCUMENTS

| | | | |
|---|---|---|---|
| JP | H09304601 A | 11/1997 | |
| JP | 2008-209855 A | 9/2008 | |
| JP | 2008-298839 A | 12/2008 | |
| JP | 2013-083936 A | 5/2013 | |
| JP | 2017-207703 A | 11/2017 | |
| JP | 2019-095775 A | 6/2019 | |
| KR | 10-2008-0035418 A | 4/2008 | |
| KR | 10-2008-0101800 A | 11/2008 | |
| KR | 10-2008-0108059 A | 12/2008 | |
| KR | 10-2009-0070830 A | 7/2009 | |
| KR | 10-2010-0071331 A | 6/2010 | |
| KR | 10-2014-0086465 A | 7/2014 | |
| KR | 10-2015-0112759 A | 10/2015 | |
| KR | 10-2019-0000964 A | 1/2019 | |
| KR | 10-2019-0040629 A | 4/2019 | |
| TW | 200525175 A | 8/2005 | |
| WO | WO-2014084012 A1 * | 6/2014 | G02B 5/0242 |
| WO | WO 2015/145645 A1 | 10/2015 | |
| WO | WO 2018/235803 A1 | 12/2018 | |

OTHER PUBLICATIONS

The Japan Patent Office, Office Action, Japanese Patent Application No. 2022-194576, Oct. 17, 2023, 14 pages.

United States Office Action, U.S. Appl. No. 18/073,428, Apr. 19, 2023, 15 pages.

United States Office Action, U.S. Appl. No. 18/073,428, Sep. 28, 2023, 13 pages.

The Japan Patent Office, Office Action, Japanese Patent Application No. 2022-194576, Mar. 28, 2024, 13 pages.

Korean Intellectual Property Office, Office Action, Korean Patent Application No. 10-2021-0189573, Jan. 2, 2025, 17 pages.

* cited by examiner

DISPLAY PANEL INCLUDING COMPOSITE SHEET

CROSS-REFERENCE TO RELATED APPLICATIONS

The present application is a continuation of U.S. patent application Ser. No. 18/073,428 filed on Dec. 1, 2022, which claims priority to Republic of Korea Patent Application No. 10-2021-0189573, filed on Dec. 28, 2021, each of which is incorporated by reference in its entirety.

BACKGROUND

Field of Disclosure

The present disclosure relates to a display panel and more particularly to a display panel including a composite sheet.

Description of the Related Art

A liquid crystal display device is one of currently the most widely used display devices. Generally, the liquid crystal display device includes a liquid crystal display panel including a light source and a liquid crystal layer.

In order to uniformly disperse the light proceeding from the light source to the liquid crystal display panel to the entire liquid crystal display panel, optical sheets comprised of a plurality of thick layers and a diffusion plate having a relatively large thickness are being used.

Such existing optical sheets and diffusion plate increase the thickness and weight of the liquid crystal display panel. Also, the existing optical sheets and diffusion plate generate friction with a case forming the external appearance of the display panel, so that image quality is degraded.

SUMMARY

The present disclosure is intended to solve the above problems. The purpose of the present disclosure is to provide a display panel including a composite optical sheet that can be replaced for the existing optical sheet and diffusion plate.

One embodiment is a display panel including: a display panel layer; a composite sheet layer directly attached to a bottom of the display panel layer; and a case configured to form external appearances of the display panel layer and the composite sheet layer. The composite sheet layer includes: an adhesive layer including a plurality of beads; and a light diffusion layer disposed below the adhesive layer.

The case includes at least one of a cover bottom, a guide panel, and a case top. A bottom surface of the composite sheet layer is not in contact with the case.

The adhesive layer includes: a first layer including an adhesive material; a plurality of beads disposed in the form of a single layer on the first layer; and a second layer configured to be disposed on the plurality of beads and the first layer and to include the adhesive material.

Each of the plurality of beads includes: a core layer; and an outer layer surrounding the core layer.

A refractive index of the core layer is greater than a refractive index of the outer layer.

A refractive index of the outer layer is greater than a refractive index of the adhesive material.

The plurality of beads have different sizes with a margin of error equal to or less than three times an average size of the beads.

The display panel further includes an air bubble disposed in the second layer.

The air bubble is formed between adjacent ones of the beads.

A size of the air bubble is smaller than a size of the plurality of beads.

A size of the air bubble is smaller than three times a size of the plurality of beads.

A thickness of the first layer is greater than a thickness of the second layer on the basis of a virtual line (VL) passing through a center of the plurality of beads.

The light diffusion layer includes: two support layers facing each other; and a plurality of prisms formed between the support layers.

The plurality of prisms includes: a first prism having a first height and a first width; and a second prism having a second height different from the first height, and the first width.

The plurality of prisms includes particles therein.

The display panel further includes: the plurality of beads disposed in the form of a single layer on the second layer; and a third layer which is disposed on the plurality of beads and the second layer and includes the adhesive material.

An additional light diffusion layer is disposed below the light diffusion layer. The additional light diffusion layer includes: two additional support layers facing each other; and a plurality of prisms formed between the two additional support layers.

The adhesive layer includes: a first layer including an adhesive material; a plurality of beads disposed in the form of a single layer on the first layer; and a second layer configured to be disposed on the plurality of beads and the first layer and to include the adhesive material. The light diffusion layer includes: two support layers facing each other; and a plurality of prisms formed between the support layers. The display panel includes: a light recycling layer disposed between the adhesive layer and the light diffusion layer; and a photoactive layer disposed below the adhesive layer.

In another embodiment, a display panel comprises a display panel layer; a light diffusion layer directly attached to the display panel layer with an adhesive layer disposed between the display panel layer and the light diffusion layer; and a plurality of light sources irradiating light toward the display panel layer through the light diffusion layer. The adhesive layer may comprise a plurality of beads configured to refract the light from the light sources.

According to the embodiment of the present disclosure, it is possible to remove the optical sheet layer and the diffusion plate disposed under the panel layer of the conventional display panel.

According to the embodiment of the present disclosure, the thickness of the display panel can be reduced by removing the thick optical sheet layer and the diffusion plate and by disposing the thin composite sheet.

According to the embodiment of the present disclosure, since the composite sheet layer is directly attached to the bottom of the panel layer, it is possible to prevent the image quality degradation due to contraction and expansion occurring in a high or low temperature environment.

According to the embodiment of the present disclosure, since the composite sheet layer does not contact the cover bottom, the guide panel, or the case top, it is possible to prevent rub due to contraction and expansion occurring in a high temperature or low temperature environment.

According to the embodiment of the present disclosure, light is diffused through the beads having the core layer and the outer layer, so that the light traveling to the display panel can be widely diffused.

DETAILED DESCRIPTION

Hereinafter, embodiments of the present disclosure will be described with reference to the accompanying drawings. In this specification, when it is mentioned that a component (or region, layer, portion) "is on", "is connected to", or "is combined with" another component, terms "is on", "connected to", or "combined with" mean that a component may be directly connected to/combined with another component or mean that a third component may be disposed between them.

The same reference numerals correspond to the same components. Also, in the drawings, the thicknesses, ratios, and dimensions of the components are exaggerated for effective description of the technical details. A term "and/or" includes all of one or more combinations that related configurations can define.

While terms such as the first and the second, etc., can be used to describe various components, the components are not limited by the terms mentioned above. The terms are used only for distinguishing between one component and other components. For example, the first component may be designated as the second component without departing from the scope of rights of various embodiments. Similarly, the second component may be designated as the first component. An expression of a singular form includes the expression of plural form thereof unless otherwise explicitly mentioned in the context.

Terms such as "below", "lower", "above", "upper" and the like are used to describe the relationships between the components shown in the drawings. These terms have relative concepts and are described based on directions indicated in the drawings.

In the present specification, it should be understood that the term "include" or "comprise" and the like is intended to specify characteristics, numbers, steps, operations, components, parts or any combination thereof described in the specification, and intended not to previously exclude the possibility of existence or addition of at least one another characteristics, numbers, steps, operations, components, parts or any combination thereof.

Also, in the present specification, an exemplary liquid crystal display panel will be described for convenience of description. However, the idea of the present disclosure is not limited to the liquid crystal display panel, and can be applied in the same manner to other types of display panels, for example, an organic light emitting display panel, a mini-LED display panel, and the like.

Also, for convenience of description, a direct light type liquid crystal display panel will be exemplarily described. However, the idea of the present disclosure can be applied in the same manner to other types, for example, a side light type liquid crystal display panel.

Figure 1:
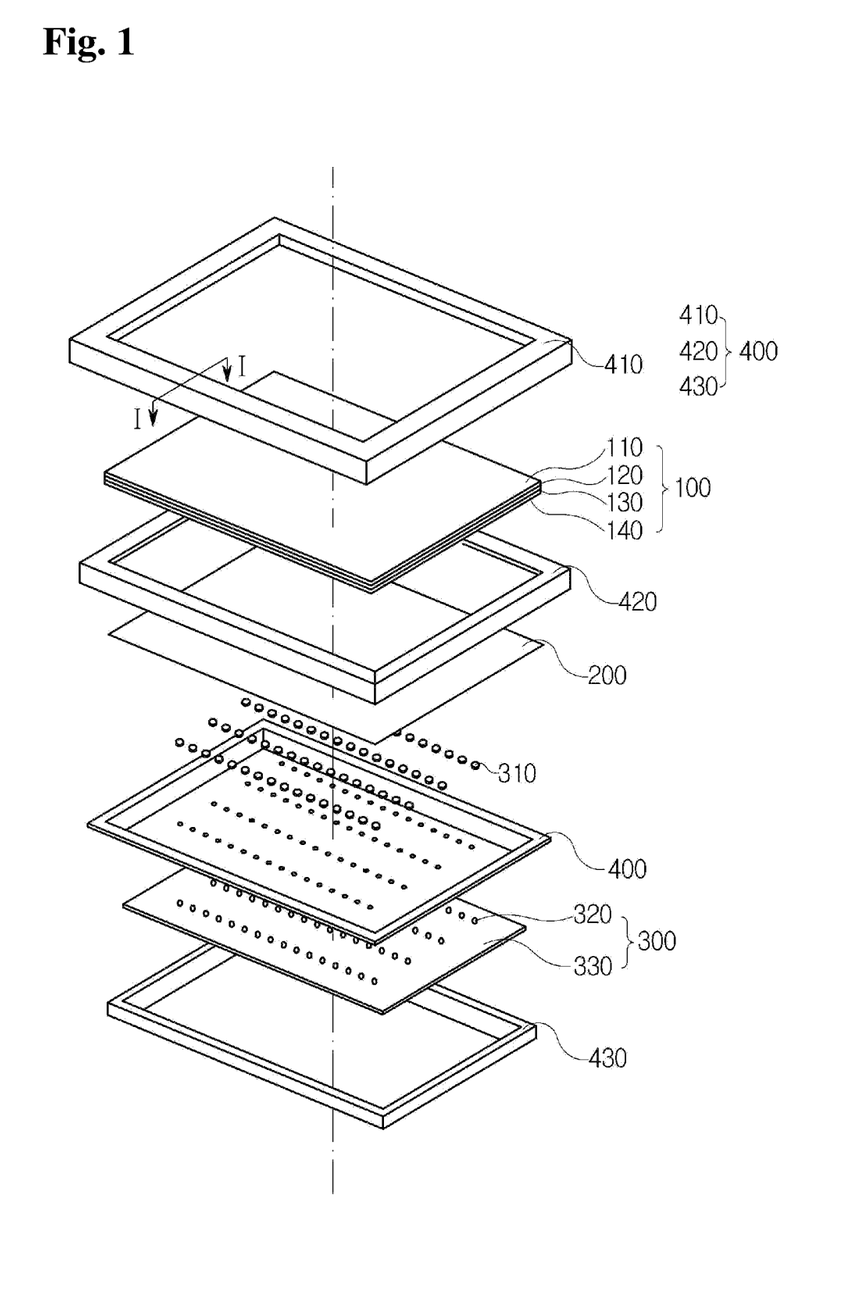
FIG. 1 is an exploded perspective view showing a display panel according to an embodiment of the present disclosure.

FIG. 1 is an exploded perspective view showing a display panel according to an embodiment of the present disclosure.

Figure 2:
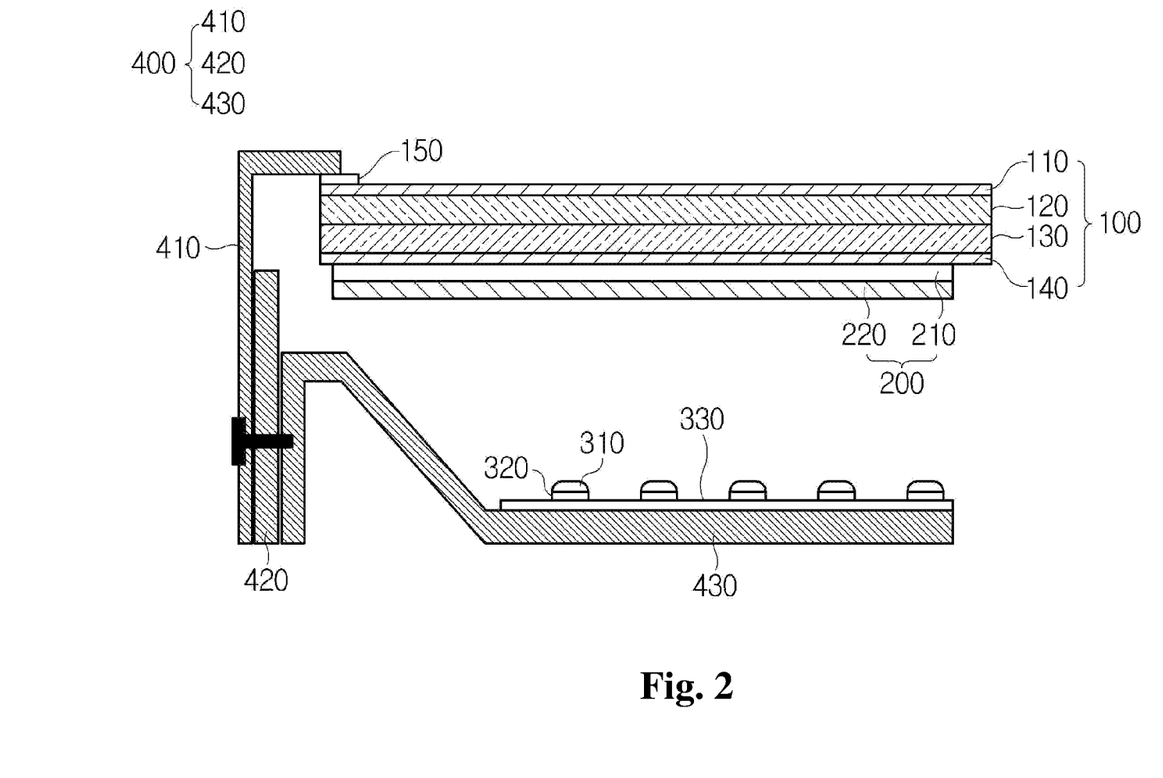
FIG. 2 is a cross-sectional view taken along line I-I of FIG. 1.

FIG. 2 is a cross-sectional view taken along line I-I of FIG. 1.

A display panel according to the embodiment of the present disclosure will be described with reference to FIGS. 1 and 2.

The display panel according to the embodiment of the present disclosure may include a panel layer 100, a composite sheet layer 200, a backlight driver 300, and a case 400.

The panel layer 100 includes a lower substrate 130 on which a switching element is disposed, an upper substrate 120 disposed on the lower substrate 130, an upper polarizing film 110 disposed on the upper substrate 120, and a lower polarizing film 140 disposed below the lower substrate 130. The display panel may be a liquid crystal panel, and the panel layer 100 may include a liquid crystal layer. In the lower substrate 130, pixels may be formed at every intersection of gate lines and data lines. The pixel may include a thin film transistor, a common electrode, and a pixel electrode. The thin film transistor may perform a switching operation of transmitting and controlling an electrical signal to each pixel. A common voltage for driving a liquid crystal is applied to the common electrode. The pixel electrode may be disposed on a passivation layer covering the common electrode and may be connected to the thin film transistor. The upper substrate 120 may include a color filter and a black matrix. Red (R), Green (G), and Blue (B) patterns may be formed on the color filter. The black matrix may be disposed between the R, G, and B patterns of the color filter. A column spacer for maintaining a cell gap may be disposed between the upper substrate 120 and the lower substrate 130.

The upper polarizing film 110 may be attached on the upper substrate 120, and the lower polarizing film 140 may be disposed below the lower substrate 130. The upper polarizing film 110 and the lower polarizing film 140 may have different polarization functions through a stretching process in opposite directions, and may have contractile forces in opposite directions according to stretching. Due to the opposite contractile forces, the panel layer 100 is able to create a flat state without being bent upwardly or downwardly.

The composite sheet layer 200 may be disposed to be directly attached to the bottom of the panel layer 100. The composite sheet layer 200 may include an adhesive layer 210 attached to the bottom of the panel layer 100 and include a light diffusion layer 220 disposed below the adhesive layer 210.

Specifically, the adhesive layer 210 may be directly attached to the panel layer 100. The direct attachment may mean that the adhesive layer 210 and the panel layer 100 are in contact with each other without being spaced apart from each other. A conventional display panel generally includes an optical sheet layer and a diffusion plate below the panel layer 100. Also, in the conventional display panel, the panel layer is spaced apart from the optical sheet layer therebelow by a predetermined distance. This intends to obtain an optical path for allowing light that passes through the diffusion plate and the optical sheet layer and travels to the panel layer to sufficiently diffuse. Unlike conventional display panels, since the light passing through the composite sheet layer 200 according to embodiments herein is sufficiently diffused due to the peculiarity of the structure of the display panel proposed in the present disclosure, the composite sheet layer 200 can be directly attached without being spaced apart from the panel layer 100. A principle in which the composite sheet layer 200 according to the embodiment of the present disclosure diffuses light will be described later with reference to FIGS. 3 to 10.

Also, the thickness of the optical sheet layer included in the conventional display panel is about 270 µm, and since at least three optical sheet layers are generally used, the total thickness of the optical sheet layer is about 810 µm or more. In addition, the diffusion plate disposed below the optical sheet layer in the conventional display panel had a thickness of about 1.5 cm. In contrast, the display panel proposed in the present disclosure includes the composite sheet layer 200 without the optical sheet layer and the diffusion plate. The composite sheet layer 200 has a thickness of only about 400 µm. Accordingly, the composite sheet layer 200 according to the embodiment of the present disclosure may be easily attached to the bottom of the panel layer 100. In addition, the composite sheet layer 200 according to the embodiment of the present disclosure can reduce the total thickness of the display panel.

Also, since the optical sheet layer and the diffusion plate included in the conventional display panel are thick and heavy, the case forming the external appearance of the display panel had to support the diffusion plate in the vertical direction. For example, a guide panel generally has a structure which has a protrusion or a horizontal portion in a horizontal direction and the diffusion plate is supported in a vertical direction by the protrusion or a horizontal portion. When the conventional display panel is exposed to a high or low temperature environment, the display panel, the optical sheet layer, and the diffusion plate contract or expand. In this case, since the degree of contraction or expansion of the display panel is different from the degree of contraction or expansion of the optical sheet layer or the diffusion plate, there is a problem that luminance degradation occurs. In addition, rub occurs due to contraction and expansion at a contact portion between the diffusion plate and the case in order that the diffusion plate is supported by the case, so that the diffusion plate is damaged.

In contrast, the composite sheet layer 200 according to the embodiment of the present disclosure can be directly attached to the bottom of the panel layer 100. Accordingly, even when the display panel is exposed to a high or low temperature environment, the degree of contraction or expansion of the panel layer 100 coincides to a certain extent with how much the composite sheet layer 200 contracts or expands, so that it is possible to prevent the luminance degradation. In addition, the composite sheet layer 200 according to the embodiment of the present disclosure may not be supported by the case 400. For example, as will be described later, the case 400 includes at least one of a case top 410, a guide panel 420, and a cover bottom 430, and the composite sheet layer 200 is configured not to contact the case 400. Accordingly, when the composite sheet layer 200 contracts or expands, rub with the case 400 does not occur.

The backlight driver 300 may include lenses 310, light source modules 320, and a backlight circuitry 330.

Each of the light source modules 320 is disposed on the top surface of the backlight circuitry 330 in such a way as to be in parallel to each other to be spaced apart from each other. The light source module 320 irradiates light to the bottom surface of the panel layer 100. The light source modules 320 may emit light simultaneously or individually in accordance with a light source driving signal output from the backlight driver 300. For example, the light source module 320 may use local dimming in order to partially control the luminance. According to the embodiment, the light source module 320 may be comprised of a chip scale package and mounted directly on the top surface of the backlight circuitry 330.

The lens 310 may be disposed on the light source module 320 and may diffuse light incident from the light source module 320. The lens 310 may be formed to have an aspheric surface and may have optical axis asymmetry. Since the lens 310 has an aspheric surface, the occurrence of aberration can be prevented. For example, the top surface of the lens 310 has an elliptical shape and the central portion of the bottom surface of the lens 310 has a conical shape, so that it is possible to prevent a hot spot and to diffuse light.

The case 400 may include the case top 410, the guide panel 420, and the cover bottom 430. The cover bottom 430 may define a lower external appearance of the display panel. The backlight circuitry 330 may be received on the top of the cover bottom 430. The guide panel 420 may be coupled to a side surface of the cover bottom 430. The case top 410 may define a side external appearance of the display panel. The case top 410 may be coupled to a side surface of the guide panel 420. The case top 410 may cover a portion of the top of the panel layer 100. To this end, the adhesive member 150 may be interposed between the case top 410 and the panel layer 100.

As described above, the case 400 according to the embodiment of the present disclosure is not in contact with the composite sheet layer 200. That is, the case 400 may not have a configuration for supporting the composite sheet layer 200. For example, the guide panel in the conventional display panel, which has the horizontal portion or the protrusion in order to support the panel layer, may be omitted. For another example, the guide panel 420 according to the embodiment of the present disclosure may not include the horizontal portion or the protrusion that is for supporting the panel layer 100.

Figure 3:
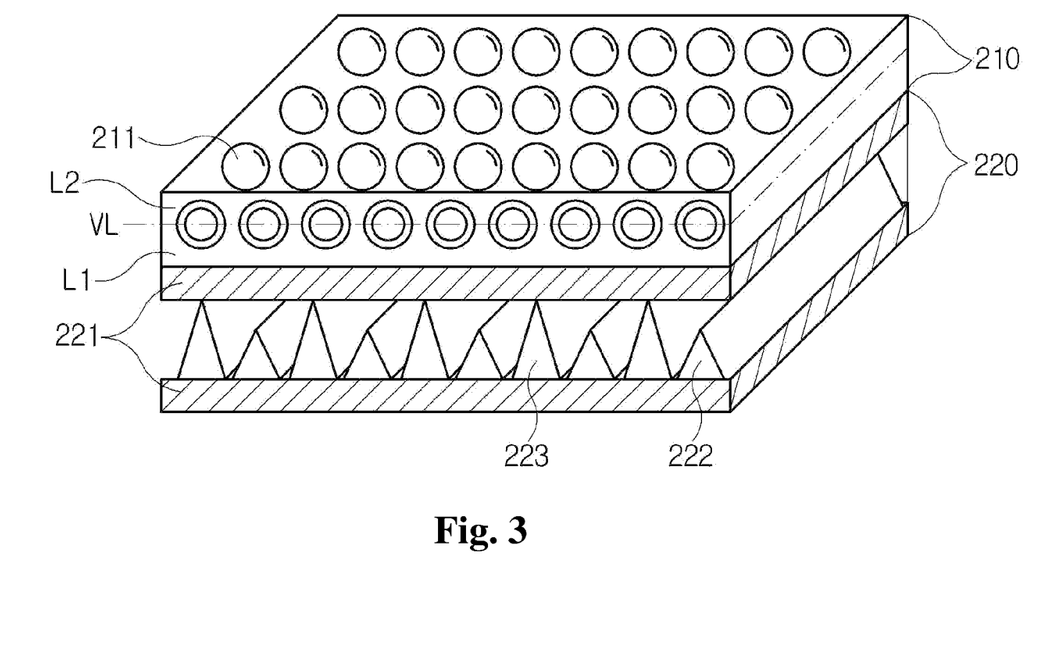
FIG. 3 is a perspective view showing a composite sheet layer according to the embodiment of the present disclosure.

FIG. 3 is a perspective view showing the composite sheet layer according to the embodiment of the present disclosure.

Figure 4:
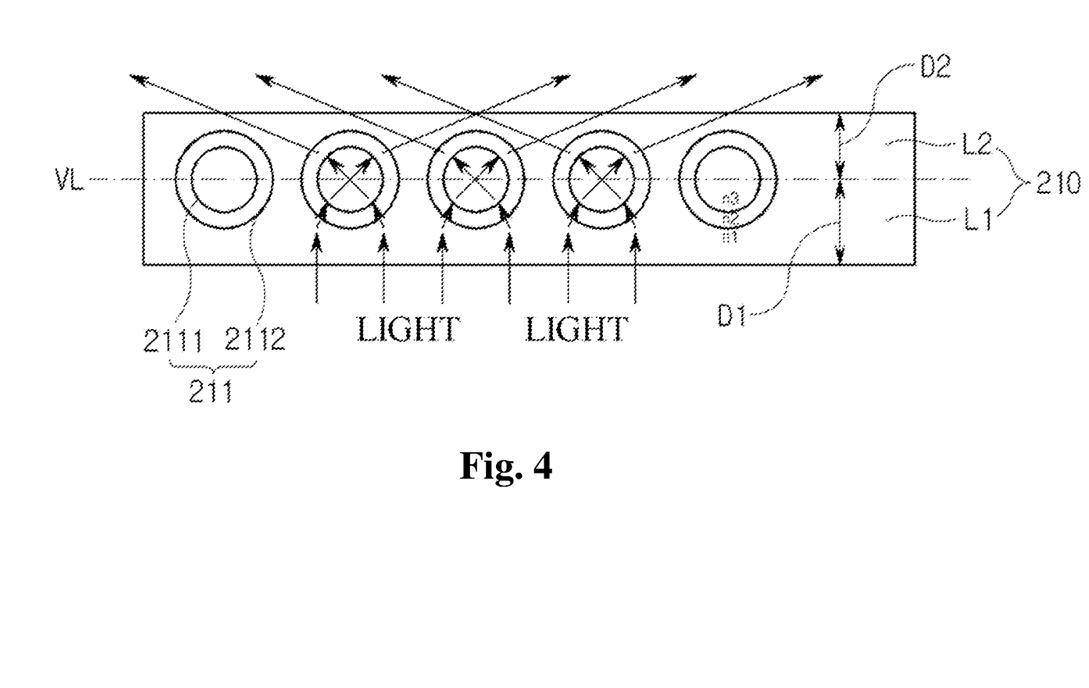
FIG. 4 is a cross-sectional view showing an adhesive layer according to the embodiment of the present disclosure.

FIG. 4 is a cross-sectional view showing the adhesive layer according to the present disclosure.

Figure 5:
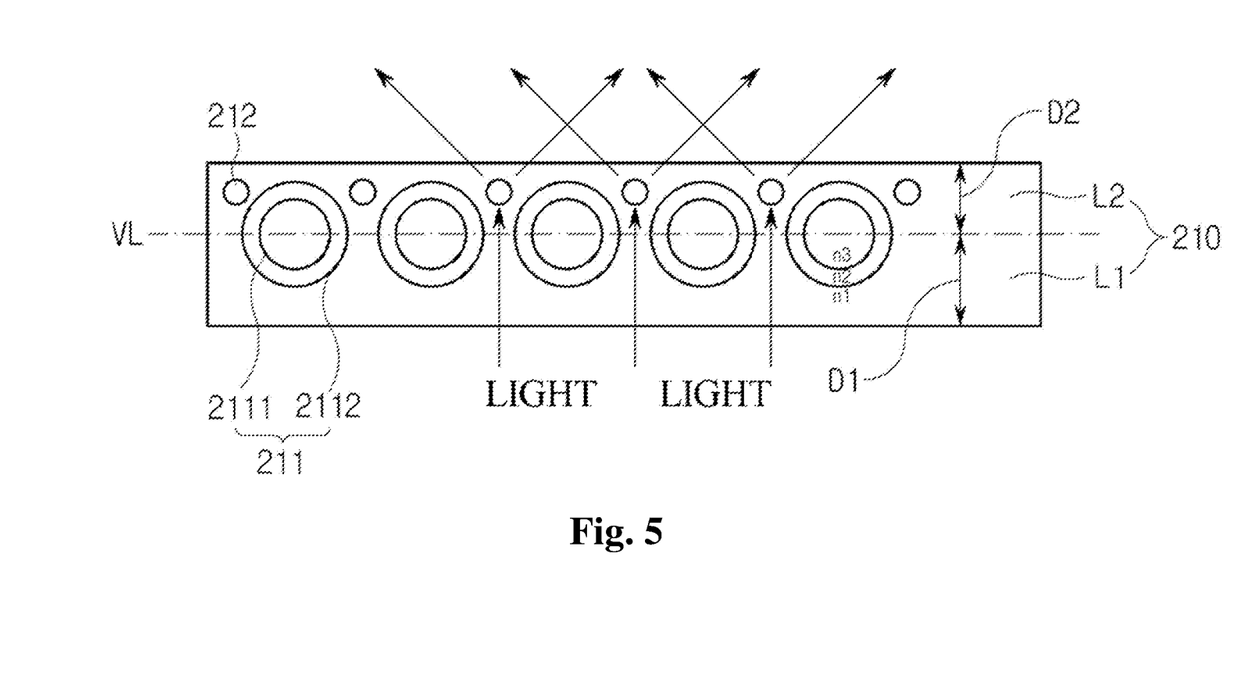
FIG. 5 is a cross-sectional view showing the adhesive layer according to the embodiment of the present disclosure.

FIG. 5 is a cross-sectional view showing the adhesive layer according to the present disclosure.

Referring to FIGS. 3 to 5, the composite sheet layer and the adhesive layer according to the embodiment of the present disclosure will be described.

The composite sheet layer 200 may include the adhesive layer 210. The adhesive layer 210 may include a first layer L1 including an adhesive material, a plurality of beads 211 disposed in the form of a single layer on the first layer L1, and a second layer L2 which is disposed on the first layer L1 and the beads 211 and includes the adhesive material. That is, the adhesive layer 210 may include the first layer L1 and the second layer L2, and may include the plurality of beads 211 disposed in the form of a single layer at the boundary between the first layer L1 and the second layer L2.

Here, the first layer L1 and the second layer L2 may be physically separated or may not be independent layers. That is, since both the first layer L1 and the second layer L2 include the adhesive material, the adhesive layer 210 may be implemented as one layer including the plurality of beads 211 therewithin.

For example, the adhesive material of the adhesive layer 210 may be a pressure sensitive adhesive (PSA) and may be a transparent material that allows light emitted from the light source module 320 to pass therethrough.

As an example, a method for forming the adhesive layer 210 will be described as follows. The first layer L1 may be formed of the adhesive material. The plurality of beads 211 may be disposed on the formed first layer L1. The second layer L2 covering the first layer L1 and the beads can be disposed by rolling and moving, on the first layer L1, a roller that has wound the adhesive material forming the second layer L2.

The adhesive layer 210 formed in this way includes the plurality of beads 211 therein, and the plurality of beads 211 may be formed in the form of a single layer. When the optical sheet included in the conventional display panel includes the beads, the beads are not formed in the form of a single layer and are arranged to overlap each other or are in contact with each other, so that the shape of the beads is damaged. The conventional display panel has an advantage in diffuse reflection of light. However, the conventional display panel has a difficulty in diffusing the light to the edge of the panel layer. This degrades the overall luminance of the display panel. In contrast, according to the embodiment of the present disclosure, the plurality of beads 211 are formed in the form of a single layer within the adhesive layer 210, so that light can be diffused to the edge of the panel layer 100.

Referring to FIG. 4, assuming a virtual line VL passing through the center of the plurality of beads 211, a distance D1 from the virtual line VL to the first layer L1 and a distance D2 from the virtual line VL to the second layer L2 may be the same as or different from each other. That is, the thickness D1 of the first layer L1 may be the same as or different from the thickness D2 of the second layer L2. For example, if the thickness D1 of the first layer L1 and the thickness D2 of the second layer L2 are the same as each other, it can be seen that the plurality of beads 211 are formed in the center of the adhesive layer 210.

Preferably, based on the virtual line VL, the thickness D1 of the first layer L1 may be greater than the thickness D2 of the second layer L2. That is, the plurality of beads 211 may be formed closer to the top surface within the adhesive layer 210. In this case, it is possible to sufficiently obtain an optical path of the light traveling from the bottom. This may be more advantageous in diffusing the light in the horizontal direction.

The plurality of beads 211 may have a spherical shape. Also, the plurality of beads 211 may include a core layer 2111 and an outer layer 2112 surrounding the core layer 2111. That is, the beads 211 according to the embodiment of the present disclosure may be implemented as a double layer. The core layer 2111 and the outer layer 2112 may include a nylon-based resin or a urethane-based resin and may have a predetermined elasticity. A refractive index of the adhesive material constituting the first layer L1 and the second layer L2 is referred to as n1, the refractive index of the outer layer 2112 is referred to as n2, and the refractive index of the core layer 2111 is referred to as n3. According to the embodiment of the present disclosure, the refractive index n3 of the core layer 2111 may be greater than the refractive index n2 of the outer layer 2112. Also, the refractive index n2 of the outer layer 2112 may be greater than the refractive index n1 of the adhesive material. As shown in FIG. 4, the light traveling from the bottom to the top is primarily refracted in the horizontal direction at the boundary between the adhesive material and the outer layer 2112. Also, the primarily refracted light is secondarily refracted in the horizontal direction at the boundary between the outer layer 2112 and the core layer 2111. Also, the secondarily refracted light is tertiarily refracted at the boundary between the core layer 2111 and the outer layer 2112. The tertiarily refracted light is quaternarily refracted at the boundary between the outer layer 2112 and the adhesive material. As such, due to the double-layer structure and refractive index of the bead 211, the light traveling from the bottom can be sufficiently diffused in the horizontal direction.

Meanwhile, the plurality of beads 211 according to the embodiment of the present disclosure may have a uniform size. If the size of the plurality of beads 211 is non-uniform, then a margin of error may be within three times the average size of the plurality of beads 211.

Referring to FIG. 5, the adhesive layer 210 according to the embodiment of the present disclosure may include air bubbles 212. The air bubble 212 may be disposed in the second layer L2. Also, the air bubble 212 may be formed between adjacent beads 211.

For example, a method for forming the air bubble 212 within the adhesive layer 210 will be described as follows. As described above, after the first layer L1 is formed of an adhesive material, the plurality of beads 211 may be disposed on the first layer L1. Then, when a roller that has wound the adhesive material forming the second layer L2 rolls and moves on the first layer L1, the air bubble 212 may or may not be formed by controlling the pressure or moving speed of the rolling. When the roller forms the air bubbles 212, the size of the air bubbles 212 can be controlled. For example, if the moving speed of the rolling is reduced while the rolling pressure is increased, the air bubble 212 may not be formed or may be formed small. For example, if the moving speed is increased while the rolling pressure is reduced, the size of the air bubble 212 may be increased.

Such an air bubble 212 may diffuse the light traveling from the bottom to the top. Since the refractive index of the adhesive material and the refractive index of the air bubble (i.e., the refractive index of air) are different from each other, the light traveling from the bottom and passing through the air bubble may be refracted in the horizontal direction.

Meanwhile, the size of the air bubble 212 may be determined in various ways according to the type or size of the display panel or the environment in which the display panel is disposed. For example, the size of the air bubble 212 may be smaller than the size of the bead 211. For another example, the size of the air bubble 212 may be larger than the size of the bead 211. However, the size of the air bubble 212 may be smaller than three times the size of the bead 211.

Figure 6:
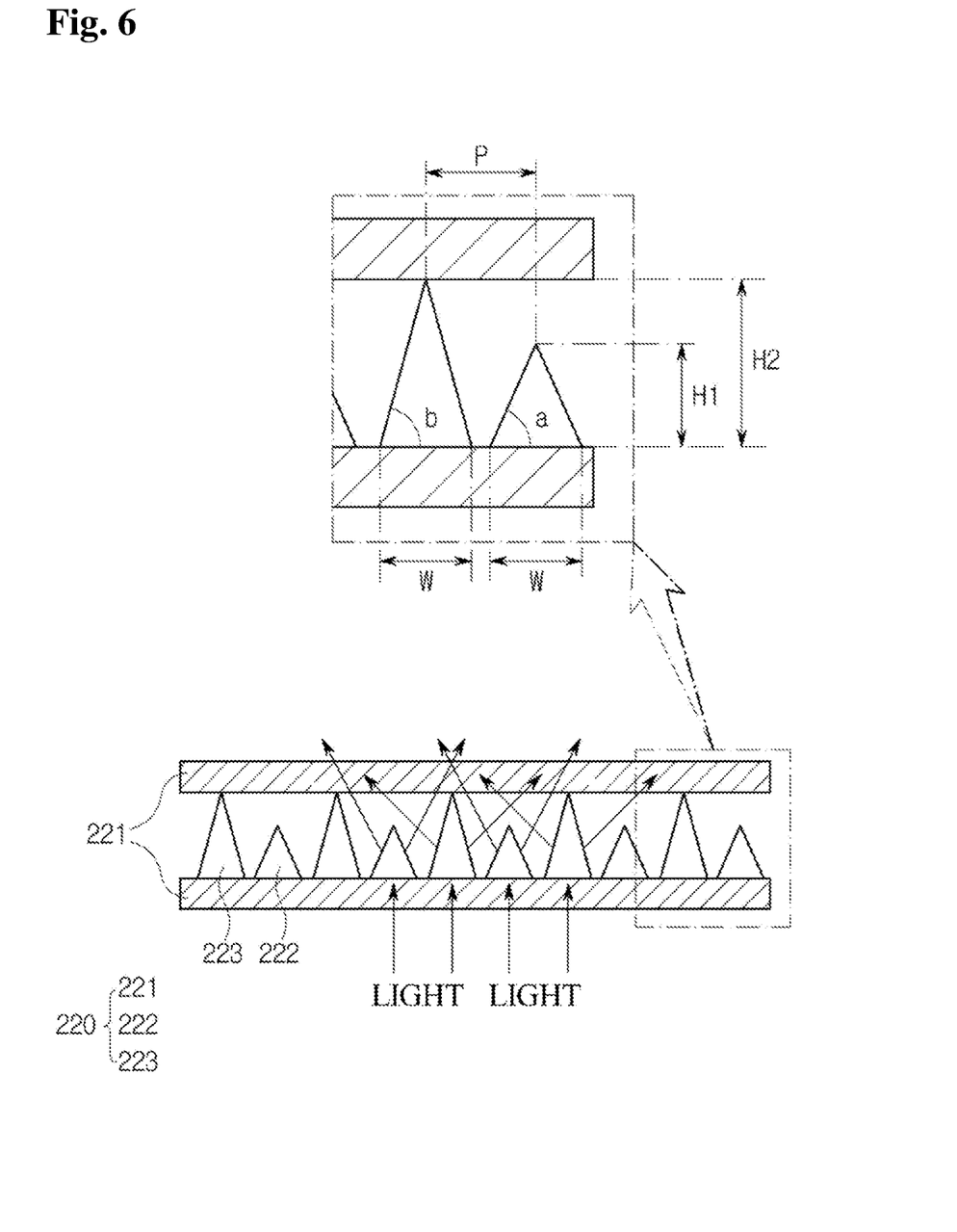
FIG. 6 is a cross-sectional view showing a light diffusion layer according to the embodiment of the present disclosure.

FIG. 6 is a cross-sectional view showing the light diffusion layer according to the embodiment of the present disclosure.

Figure 7:
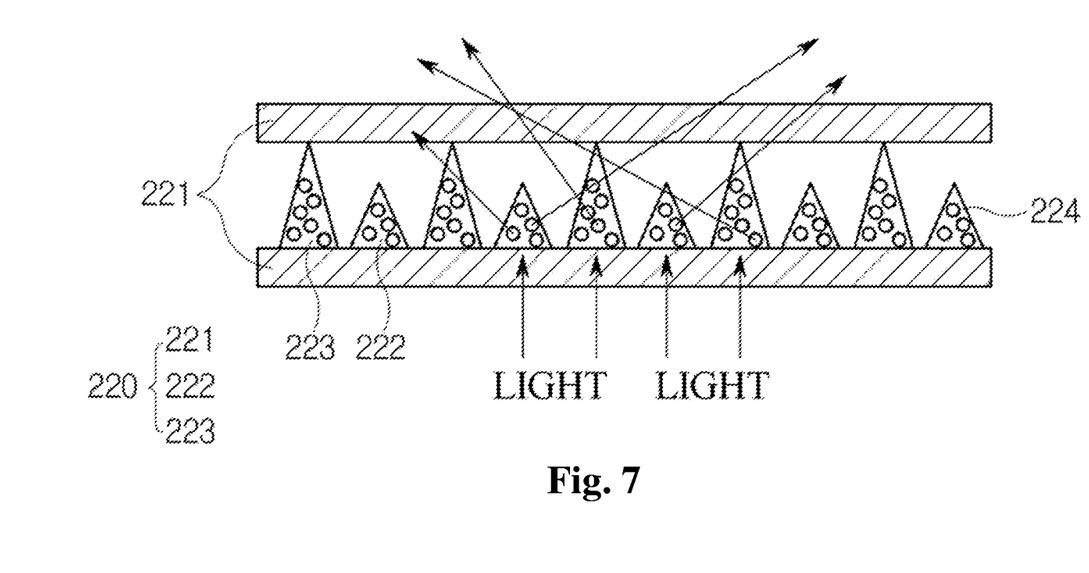
FIG. 7 is a cross-sectional view showing the light diffusion layer according to the embodiment of the present disclosure.

FIG. 7 is a cross-sectional view showing the light diffusion layer according to the embodiment of the present disclosure.

The composite sheet layer and the light diffusion layer according to the embodiment of the present disclosure will be described with reference to FIGS. 3, 6, and 7.

The light diffusion layer 220 may be disposed below the adhesive layer 210. The light diffusion layer 220 may include two support layers 221 facing each other and a plurality of prisms 222 and 223 formed between the support layers 221.

The support layer 221 may be formed of a transparent material that allows the light traveling from the bottom to the top to pass therethrough. The support layer 221 may serve to obtain rigidity of the light diffusion layer 220. The support layer 221 may be formed of, for example, polyethylene terephthalate (PET).

The two support layers 221 may be spaced apart from each other at regular intervals, and the plurality of prisms 222 and 223 may be disposed in a space between the two spaced support layers 221.

The plurality of prisms may include a first prism 222 having a first height H1 and a second prism 223 having a second height H2. The plurality of prisms 222 and 223 may be spaced apart from each other at regular intervals P. For example, the first height H1 of the first prism 222 may be 60 μm, and the second height H2 of the second prism 223 may be 70 μm. The interval P between the plurality of prisms 222 and 223 may be, for example, 35 μm.

Also, a width W of the first prism 222 may be the same as the width W of the second prism 223. That is, the first prism 222 may have a first width W, and the second prism 223 may also have the first width W. For example, the first width W of the plurality of prisms 222 and 223 may be 35 μm.

That is, the first prism 222 may have the first height H1 and the first width W, and the second prism 223 may have the second height H2 and the first width W. Accordingly, an inclination angle "a" of the first prism may be different from an inclination angle "b" of the second prism. Referring to FIG. 6, the light traveling from the bottom to the top is refracted in the horizontal direction while passing through the first prism 222 and the second prism 223. Here, due to the different inclination angles "a" and "b" of the first prism 222 and the second prism 223, the refraction angle of the light passing through the first prism 222 is different from the refraction angle of the light passing through the second prism 223.

Although the present disclosure has exemplarily described the prism, the idea of the present disclosure is not limited thereto, and the prism may be replaced with a member having another type of light diffusion function. For example, a micro lens, a lenticular lens, etc., may be used instead of the prism.

Referring to FIG. 7, the plurality of prisms 222 and 223 according to the embodiment of the present disclosure may include particles 224 therein. The particle 224 may be made of a transparent material, for example, titanium oxide ($TiO_2$) or silicon oxide ($SiO_2$). Alternatively, the particle 224 may be air. Such particles 224 may be randomly dispersed within the prisms 222 and 223. The light traveling from the bottom to the top is refracted while passing through the particle 224. Since the particles 224 are randomly disposed within the prisms 222 and 223, the refracted light may also be randomly refracted.

Figure 8:
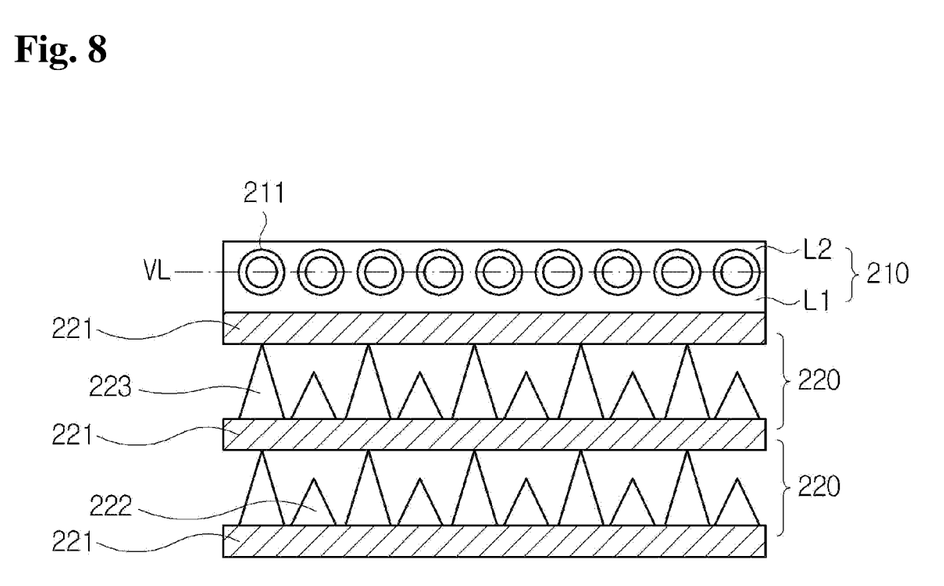
FIG. 8 is a diagram showing a composite sheet layer according to another embodiment of the present disclosure.

FIG. 8 is a diagram showing a composite sheet layer according to another embodiment of the present disclosure.

Figure 9:
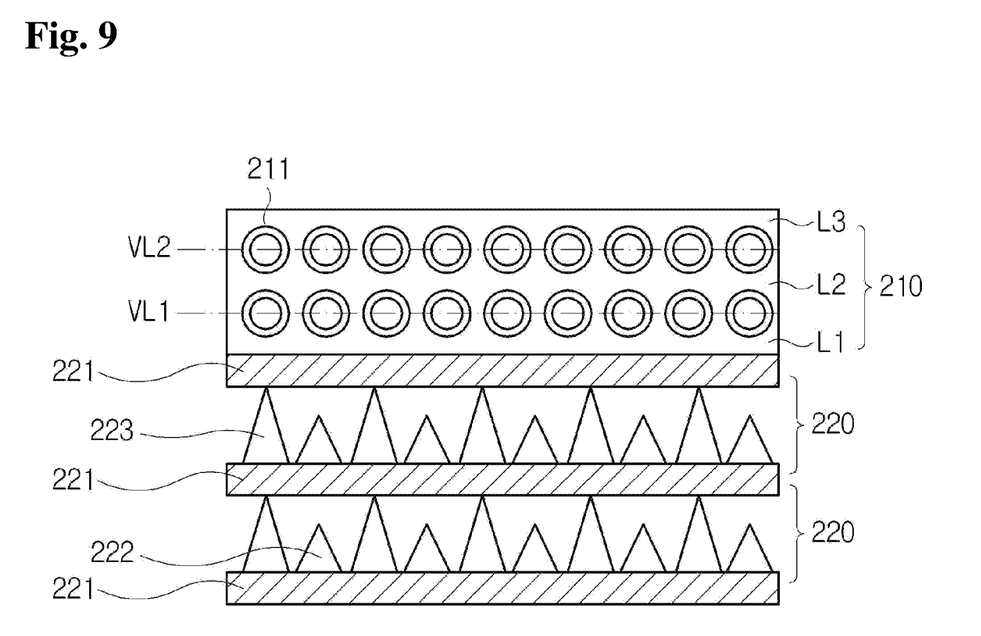
FIG. 9 is a diagram showing a composite sheet layer according to still another embodiment of the present disclosure.

FIG. 9 is a diagram showing a composite sheet layer according to still another embodiment of the present disclosure.

Figure 10:
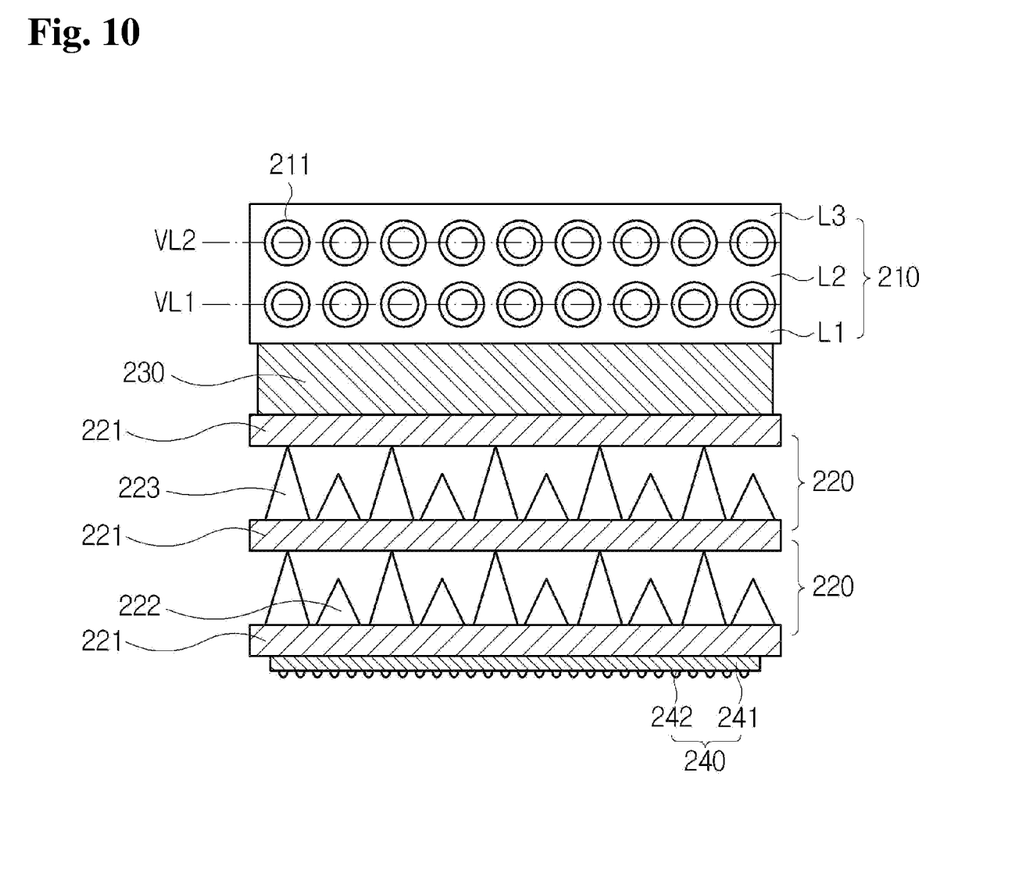
FIG. 10 is a diagram showing a composite sheet layer according to yet another embodiment of the present disclosure.

FIG. 10 is a diagram showing a composite sheet layer according to yet another embodiment of the present disclosure.

A composite sheet layer according to another embodiment of the present disclosure will be described with reference to FIGS. 8 to 10.

First, referring to FIG. 8, the composite sheet layer 200 may include the adhesive layer 210, and the light diffusion layer 220 that is a double light diffusion layer.

That is, the composite sheet layer 200 according to the embodiment of the present embodiment may include the adhesive layer 210 including the first layer L1, the plurality of beads 211, and the second layer L2. Three support layers 221 facing each other may be disposed below the adhesive layer 210. The plurality of first prisms 222 and the plurality of second prisms 223 may be disposed between the support layers 221 facing each other. As shown in FIG. 8, and aforementioned in reference with FIG. 4, the thickness of the first layer L1 may be the same as or different from the thickness of the second layer L2. For example, if the thickness of the first layer L1 and the thickness of the second layer L2 are the same as each other, it can be seen that the plurality of beads 211 are formed in the center of the adhesive layer 210. Preferably, based on the virtual line VL, the thickness of the first layer L1 may be greater than the thickness of the second layer L2. That is, the plurality of beads 211 may be formed closer to the top surface within the adhesive layer 210. This may be more advantageous in diffusing the light in the horizontal direction.

In other words, the composite sheet layer 200 according to the embodiment of the present embodiment may include an additional light diffusion layer 220 below the light diffusion layer 220, and the additional light diffusion layer 220 may include two support layers 221 facing each other and the plurality of prisms 222 and 223 formed between the support layers 221.

Referring to FIG. 9, the composite sheet layer 200 may include a double adhesive layer 210 and the double light diffusion layer 220. That is, according to the embodiment of the present embodiment, the double adhesive layer 210 includes the first layer L1, the plurality of beads 211 disposed in the form of a single layer on the first layer L1, the second layer L2 disposed on the first layer L1 and the plurality of beads 211, the plurality of beads 211 disposed in the form of a single layer on the second layer L2, and a third layer L3 disposed on the second layer L2 and the plurality of beads 211. As shown in FIG. 9, and aforementioned in reference with FIG. 4, the thickness of the first layer L1 may be the same as or different from the thickness of the second layer L2. For example, based on the virtual line VL1, the thickness of the first layer L1 may be greater than the thickness of the second layer L2. That is, the plurality of beads 211 may be formed closer to the top surface within the adhesive layer 210. Also, based on the virtual line VL2, the thickness of the second layer L2 may be greater than the thickness of the third layer L3. That is, the plurality of beads 211 may be formed closer to the top surface within the adhesive layer 210. This may be more advantageous in diffusing the light in the horizontal direction.

Referring to FIG. 10, the composite sheet layer 200 may include the double adhesive layer 210 and the double light diffusion layer 220, may include a light recycling layer 230 between the adhesive layer 210 and the light diffusion layer 220, and may include a photoactive layer 240 below the light diffusion layer 220. For another example, a single adhesive layer 210 may be used instead of the double adhesive layer 210, and a single light diffusion layer 220 may be used instead of the double light diffusion layer 220.

The light recycling layer 230 may include a light functional layer such as a reflective polarizing film layer or a prism layer. For example, the light recycling layer 230 may include a dual brightness enhancement film (DBEF). The light recycling layer 230 may function to recycle light. The light recycling layer 230 may polarize light and recycle unpolarized light. For example, the light recycling layer 230 may transmit the polarized light and reflect the unpolarized light to a lower backlight unit again. The reflected light may be re-reflected by a reflective plate attached to the top surface of the cover bottom 430 and may travel upward again.

The photoactive layer 240 may include a binder layer 241 and active beads 242. The active beads 242 may have various sizes. For example, the active beads 242 may be made of a material having a predetermined elasticity and may include a nylon-based resin or a urethane-based resin. The active beads 242 may protrude downward from the composite sheet layer 200, and thus, forms optical roughness. The binder layer 241 is formed to surround the active beads 242 and may be formed of a thermosetting resin. The binder layer 241 may serve to fix the active beads 242 to the composite sheet layer 200.

It can be understood by those skilled in the art that the embodiments can be embodied in other specific forms without departing from its idea or essential characteristics. Therefore, the foregoing embodiments and advantages are merely exemplary and are not to be construed as limiting the present disclosure. The scopes of the embodiments are described by the scopes of the following claims rather than by the foregoing description. All modification, alternatives, and variations derived from the scope and the meaning of the scope of the claims and equivalents of the claims should be construed as being included in the scopes of the embodiments.

What is claimed is:

1. A display panel comprising:
a display panel layer;
a composite sheet layer directly attached to a bottom of the display panel layer; and
a case configured to form external appearances of the display panel layer and the composite sheet layer,
wherein the composite sheet layer comprises:
an adhesive layer including a plurality of beads; and
a light diffusion layer below the adhesive layer,
wherein the adhesive layer comprises:
a first layer including an adhesive material;
a second layer on the first layer, the second layer including an adhesive material that is a same as the adhesive material of the first layer; and
a plurality of beads between the first layer and the second layer,
wherein a thickness of the first layer is greater than a thickness of the second layer based on a virtual line passing through a center of the plurality of beads, and
wherein the first layer contacts the second layer, and wherein the plurality of beads contacts the first layer and the second layer, respectively.

2. The display panel of claim 1, wherein each of the plurality of beads comprises:
a core layer; and
an outer layer surrounding the core layer.

3. The display panel of claim 2, wherein a refractive index of the core layer is greater than a refractive index of the outer layer.

4. The display panel of claim 3, wherein a refractive index of the outer layer is greater than a refractive index of the adhesive material.

5. The display panel of claim 1, wherein the display panel comprises:
a light recycling layer between the adhesive layer and the light diffusion layer; and
a photoactive layer below the adhesive layer.

6. The display panel of claim 5, wherein the light recycling layer polarize light and recycle unpolarized light, and includes a dual brightness enhancement film (DBEF).

7. The display panel of claim 5, wherein the photoactive layer includes a binder layer and active beads disposed below the binder layer.

8. The display panel of claim 1, wherein the light diffusion layer comprises:
two support layers facing each other; and
a plurality of prisms between the two support layers.

9. The display panel of claim 1, further comprising:
a plurality of light source modules disposed below a bottom surface of the composite sheet layer, and
wherein the adhesive layer and the light diffusion layer overlap the plurality of light source modules in a plan view of the display panel.

10. A display panel comprising:
a display panel layer;
a composite sheet layer directly attached to a bottom of the display panel layer; and
a case configured to form external appearances of the display panel layer and the composite sheet layer,
wherein the composite sheet layer comprises:
an adhesive layer including a plurality of beads; and
a light diffusion layer below the adhesive layer,
wherein the adhesive layer comprises:
a first layer including an adhesive material;
a second layer on the first layer and including an air bubble and an adhesive material that is a same as the adhesive material included in the first layer; and
a plurality of beads between the first layer and the second layer,
wherein the air bubble is between adjacent ones of the plurality of beads,
wherein the first layer contacts the second layer, and wherein the plurality of beads contacts the first layer and the second layer, respectively.

11. The display panel of claim 10, wherein each of the plurality of beads comprises:
a core layer; and
an outer layer surrounding the core layer.

12. The display panel of claim 11, wherein a refractive index of the core layer is greater than a refractive index of the outer layer.

13. The display panel of claim 12, wherein a refractive index of the outer layer is greater than a refractive index of the adhesive material included in the first layer or the second layer.

14. The display panel of claim 10, further comprising a plurality of light source modules disposed below a bottom surface of the composite sheet layer, and
wherein the adhesive layer and the light diffusion layer overlap the plurality of light source modules in a plan view of the display panel.

* * * * *